United States Patent Office 3,048,615
Patented Aug. 7, 1962

3,048,615
TERTIARY ALKYL AZOMETHINE COPOLYMERS
Ellis K. Fields, Chicago, Ill., assignor to Standard Oil Company, Chicago, Ill., a corporation of Indiana
No Drawing. Filed Dec. 30, 1957, Ser. No. 705,751
12 Claims. (Cl. 260—471)

This invention relates to novel compositions of matter which are effective as viscosity index improvers and detergents in lubricant compositions. More particularly, the invention pertains to improved lubricant compositions containing novel copolymers of tertiary alkyl azomethines.

Within recent years it has become common practice to impart improved properties to lubricants through the use of various types of additives or addition agents. Lubricating oils employed in internal combustion engines such as automotive and diesel engines require the use of one or more addition agents to improve their serviceability under certain adverse operating conditions. Among the more important additives employed are the type which function to prevent the formation and accumulation of sludge and varnish-like coatings on pistons and cylinder walls of the engine. Such additives which have the property of maintaining clean engines are referred to as "detergent-type" addition agents. Other addition agents in common usage are known as "viscosity index improvers." These additives function to improve the viscosity-temperature characteristics of the lubricant in which they are employed, said relationship commonly being expressed in the art as the viscosity index of the oil.

It is an object of this invention to provide novel copolymers of tertiary alkyl azomethines. Another object of this invention is to provide novel addition agents which when added to a lubricant will improve both the detergent properties and the viscosity index thereof. Still another object is to provide lubricant compositions possessing improved detergency and viscosity-temperature characteristics. Other objects and advantages of the invention will become apparent in the following description thereof.

The above objects, among others, are achieved in accordance with this invention by incorporating in a lubricating oil a novel copolymer of a tertiary alkyl azomethine, hereinafter defined, with an ethylenically unsaturated monomer, said monomer being capable of addition homopolymerization through said unsaturation. The azomethines which are useful in this invention have the general formula

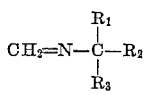

wherein $R_1$, $R_2$ and $R_3$ represent the same or different alkyl radicals, said azomethine having from 5 to about 30, and preferably from about 9 to about 16, carbon atoms in the molecule. Specific examples of azomethines included within this class and which are suitable for use in the invention are t-butyl azomethine, t-octyl azomethine, t-nonyl azomethine, t-dodecyl azomethine, t-octadecyl azomethine, t-tetracosyl azomethine and mixtures thereof. These azomethines, also known as aldimines, can readily be prepared in good yield by reacting formaldehyde with the desired t-alkylamines, drying, and distilling as is described in U.S. Patent No. 2,582,128, issued January 8, 1952, to Melvin D. Hurwitz.

Tertiary alkyl azomethines as described above are characterized by unusual thermal stability which is due to the steric configuration. I have discovered that although these compounds do not homopolymerize, they do copolymerize with other polymerizable monomers to form polymeric products which are useful as detergent additives and viscosity index improvers in lubricating oils. In general, the monomers which will copolymerize with tertiary alkyl azomethines in accordance with this invention are characterized by having ethylenic unsaturation, that is, they contain a non-aromatic

group. The monomers which are particularly suitable for copolymerizing with the azomethines are those which are relatively reactive, i.e., those which are capable of forming homopolymers in accordance with the teachings of the prior art. The preferred monomers are those containing a terminal ethylenic group, i.e. a

group, wherein at least one of the valence bonds is linked to a negative group, and the other bond is linked to hydrogen or hydrocarbon groups. The preferred monomers may therefore be defined as vinylidene compounds (which term is intended to include vinyl compounds) wherein there is attached to the vinylidene group at least one negative group, such as an aryl group (for example, as in styrene, alpha-methyl styrene, chlorinated styrenes, 3-methyl styrene, 3,4,5-trimethyl styrene, etc.); an acyloxy group (vinyl acetate, vinyl butyrate, vinyl decanoate, vinyl octadecanoate, etc.); an alkoxy group (vinyl ethyl ether, vinyl butyl ether, vinyl decyl ether, vinyl octadecyl ether, etc.); an aroyloxy group (vinyl benzoate, vinyl toluate, etc.); an aryloxy group (vinyl phenyl ether, vinyl xylyl ethers, etc.); a carbalkoxy group (butyl acrylate, butyl methacrylate, octyl acrylate, octyl methacrylate, octadecyl acrylate, octadecyl methacrylate, etc.); a halogen (vinyl chloride, vinylidene chloride, etc.); a cyano group (acrylonitrile; methacrylonitrile, etc.) For use as lubricant additives, copolymers formed from monomers containing only carbon and hydrogen atoms (for example, styrene and alkylated styrenes) or only carbon, hydrogen, and oxygen atoms (for example, unsubstituted esters and ethers) and t-alkyl azomethines are preferred.

The reactive monomers, i.e., those capable of forming homopolymers, can be used in admixture with other monomers containing internal ethylenic unsaturation which do not readily homopolymerize but which will copolymerize with the azomethine and the reactive monomers. The preferred compounds of this type are esters of butenedioic acids having the general formula

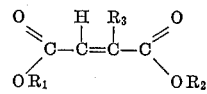

wherein $R_1$ and $R_2$ represent the same or different alkyl radicals having from about 4 to about 22 carbon atoms, and preferably from about 6 to about 12 carbon atoms, and $R_3$ is selected from the group consisting of hydrogen and a methyl radical. Examples of such internally unsaturated compounds are dibutyl fumarate, di-iso-octyl fumarate, dioctadecyl fumarate and the corresponding esters of maleic, citraconic and mesaconic acids.

For use as lubricating oil additives the copolymers of this invention must, of course, be oil soluble. In order to achieve this end it is preferred that the polymerizable monomers used in conjunction with the azomethine each have from about 6 to about 30 carbon atoms, and preferably about 10 to about 24 carbon atoms in the molecule.

In any given case oil solubility can readily be increased by adjusting the ratio of the reactants so as to increase the proportion of the more soluble monomer in the copolymer, for example the proportion of di-iso-octyl fumarate in a mixture of the same, styrene, and t-butyl azomethine, or by increasing the chain length of the substituent hydrocarbon groups, for example, the ester group when an acrylate or methacrylate is used or the side chain when an alkyl styrene is used. Suitable mole ratios of azomethine to other monomers in the copolymer range from about 1:100 to about 10:1 and preferably from about 1:50 to about 1:2. When a mixture of vinylidene compounds and internally unsaturated compounds (e.g., butenedioic acid esters such as maleates or fumarates) is used, the mole ratio of the vinylidene compounds to the other monomers should be within the range from about 1:2 to about 4:1 and preferably from about 1:1 to about 2:1 in order to insure the formation of a copolymer.

The copolymerization can be carried out by any of the methods known to the art, i.e. in bulk, in solution or in emulsion. Bulk and solution polymerization are preferred, however. A particularly useful expedient is solution polymerization in which the solvent is a lubricating oil similar to that in which the additive is to be used, e.g., an SAE 10 to SAE 30 base oil when the additive is to be used in an automotive crank-case oil. This procedure results in a concentrate of the additive in oil solution which requires no purification and which is easily handled and dispensed.

In preparing the copolymeric products of this invention there can be employed as a catalyst any compound which is capable of providing stable free radicals under the conditions of the reaction. Examples of such catalysts are peroxy compounds, for example, organic peroxides, peroxy salts, hydroperoxides, etc., such as t-butyl peroxide, acetyl peroxide, cumene hydroperoxide, t-butyl hydroperoxide, ethyl peroxy carbonate, and the like, and azo compounds such as $\alpha,\alpha'$-azodiisobutyronitrile, dimethyl and diethyl $\alpha,\alpha'$-azodiisobutyrate, etc. Such initiators can be used in a concentration of about 0.001% to 0.5% by weight. In addition, polymerization may also be initiated by the use of ultraviolet light as well as by the use of heat alone.

In general, the range of polymerization reaction temperatures employed in producing the copolymers of the present invention varies between about 25° C. and 185° C. and is preferably within the range from about 80° C. to about 120° C. It will be understood that the polymerization temperature selected will usually be varied according to the nature and amount of the particular monomers and catalysts, if any, used, the desired polymerization pressure and the molecular weight of the products which are desired. Likewise the time for polymerization will be dependent on similar factors and can range over a period from about one-half hour to about 72 hours, as will be apparent to one skilled in the art. When the preferred operating temperature of about 80 to 120° C. is employed I have found that suitable copolymers can generally be produced within a period of about 8 to 24 hours, which is accordingly the preferred range of polymerization times.

The copolymerizations of the present invention can be effected at atmospheric or higher pressures. When a volatile comonomer is used, the process can be carried out under the autogenous pressure of the reaction mixture at the temperature employed. In most cases the preferred comonomers (for example, styrene, acrylates and methacrylates, and vinyl esters and ethers) are sufficiently nonvolatile at the preferred polymerization temperature of 80–120° C., that the use of pressures in excess of atmospheric will not be necessary, although they can be used if desired.

For use as lubricant additives the copolymers of the invention should have molecular weights within the range from about 10,000 to about 125,000 and preferably within the range from about 20,000 to about 70,000. Such copolymers can be used in lubricating oils in concentrations of about 0.01% to about 10% by weight and preferably within the range from about 0.5% to about 5%.

The following examples are illustrative of my invention, and are not intended to be limiting.

EXAMPLE I

The preparation of the tertiary alkyl azomethines used in this invention is illustrated by the preparation of t-octyl azomethine, as follows: To 258 grams (2.0 mols) of t-octyl amine in a one liter flask equipped with a stirrer was added 168 grams (2.05 mols) of 36.6% aqueous formaldehyde with stirring. The temperature was maintained below 40° C. by external cooling. The mixture was cooled to 25° C. and 10 grams of potassium hydroxide was added to aid in the separation of water. The organic layer was separated, dried over KOH, filtered and distilled, giving 231.5 grams (82% yield) of t-octyl azomethine boiling at 147–151° C. atmospheric pressure.

In a similar manner the other tertiary alkyl azomethines used in the following examples were prepared using the corresponding tertiary alkyl amines and formaldehyde as the reactants.

EXAMPLE II

A mixture of 20 cc. styrene, 25 cc. di-iso-octyl fumarate, 5 cc. Primene 81–R azomethine (prepared from formaldehyde and Primene 81–R, a commercial product of Rohm and Haas Co. which is a mixture of tertiary amines consisting principally of $t-C_{12}H_{25}NH_2$ to $$t-C_{15}H_{31}NH_2$$

neutral equivalent 191, boiling range 223–240° C., sp. gr. 0.812 and $n_D^{20}$ 1.423) and 0.1 cc. t-butyl hydroperoxide was heated at 120° C. for 16 hours. The resulting light yellow copolymer had no trace of azomethine odor and was completely soluble in oil. It contained 0.75% N, and a 1% solution in toluene had a viscosity of 52.5 SSU at 20° C. (Toluene alone has a viscosity of 38.7 SSU at 20° C.)

EXAMPLE III

A mixture of 15 cc. styrene, 30 cc. di-iso-octyl fumarate, 5 cc. t-butyl azomethine, and 0.1 cc. t-butyl hydroperoxide was heated at 55° C. for 8 hours, at 70° C. for 8 hours, and at 100° C. for 8 hours. All azomethine odor had disappeared. The product was very viscous (when warm), completely oil soluble, and contained 0.31% N. It had a viscosity, 1% solution in toluene, of 50.8 SSU (20° C.).

EXAMPLE IV

A mixture of 45 cc. 2-ethylhexyl acrylate, 5 cc. Primene 81–R azomethine, and 0.1 cc. t-butyl hydroperoxide was heated at 100° C. for 24 hours. This copolymer contained 0.69% N and had a viscosity, 1% solution in toluene, of 57.7 SSU (20° C.).

EXAMPLE V

A mixture of 15 cc. styrene, 25 cc. di-iso-octyl fumarate, 10 cc. t-octyl azomethine, and 0.1 cc. t-butyl hydroperoxide was heated at 70° C. for 8 hours and at 120° C. for 8 hours. The yellow copolymer contained 0.56% N and had a viscosity, 1% solution in toluene, of 51.5 SSU (20° C.).

EXAMPLE VI

A mixture of 90 cc. n-lauryl methacrylate, 10 cc. Primene 81–R azomethine, and 0.1 cc. t-butyl hydroperoxide was heated at 120° C. for 48 hours, the last 12 hours with $N_2$ blowing. The deep orange, very viscous copolymer contained 0.28% N. A 1% solution in toluene at 20° C. had a viscosity of 51.9 SSU.

EXAMPLE VII

For comparison, and not according to the invention, a copolymer of 35.5 cc. styrene with 65 cc. di-iso-octyl fumarate was prepared by heating with 0.2 cc. t-butyl hydroperoxide at 118° C. for 20 hours. This copolymer had a viscosity, 1% solution in toluene, of 50.8 SSU (20° C.).

EXAMPLE VIII

Again for comparison with copolymers of the invention, a polymer of lauryl methacrylate was made by heating 100 cc. of the monomer with 0.2 cc. t-butyl hydroperoxide at 118° C. for 20 hours. This polymer had a viscosity, 1% solution in toluene, of 51.5 SSU (20° C.).

The polymeric products of Examples 2-6 were tested for their effectiveness as viscosity index improvers at a concentration of 2% by weight in a solvent extracted SAE 5 base oil. The results are given in the following table.

*Table I*

| Additive: | Viscosity index |
|---|---|
| None | 93 |
| Product of Example 2 | 152.5 |
| Product of Example 3 | 148 |
| Product of Example 4 | 153 |
| Product of Example 5 | 150 |
| Product of Example 6 | 150 |

The effectiveness of the copolymers of the present invention in improving the detergency characteristics of lubricating oils is demonstrated by the data in Table II. These data were obtained by subjecting a hydrocarbon oil with and without the products of Examples 2-5 to the detergency and oxidation test known as the Indiana Stirring Oxidation Test (I.S.O.T.). In this test 250 cc. of the oil to be tested is heated at 330-332° F. in a 500 cc. glass beaker in the presence of 5 square mm. of copper and 10 square mm. of iron. Four glass rods of 6 mm. diameter are suspended in the oil which is stirred at about 1300 r.p.m. by means of a glass stirrer. At intervals of 24, 48, and 72 hours oil samples are withdrawn and sludge, acidity, and varnish values are determined. Varnish values or ratings are based upon visual inspection of the glass rods, in which a rod free of any varnish deposit is given a rating of 10 while a badly coated rod is given a rating of 1. Rods having appearances between these extremes are given intermediate values. The copolymers of this invention were tested at 2% by weight concentration in a solvent extracted SAE 30 base oil containing 0.75% of sulfurized dipentene, with the results shown in Table II.

*Table II*

| Additive | Varnish Rating | | | Naphtha Insoluble (Sludge) [1] | | | Acidity (mg. KOH per g. Oil) | | |
|---|---|---|---|---|---|---|---|---|---|
| | 24 Hrs. | 48 Hrs. | 72 Hrs. | 24 Hrs. | 48 Hrs. | 72 Hrs. | 24 Hrs. | 48 Hrs. | 72 Hrs. |
| None | 10 | 8 | 5 | 0.071 | 2.1 | 5.7 | 3.92 | 7.0 | 10.08 |
| Product of Example 2 | 10 | 10 | 9 | 0 | 0.21 | 2.4 | 0.56 | 2.8 | 6.72 |
| Product of Example 3 | 10 | 10 | 9 | 0 | 2.1 | 5.0 | 2.24 | 4.2 | 8.4 |
| Product of Example 4 | 10 | 9 | 9 | 0 | 2.0 | 3.1 | 1.68 | 5.08 | 8.12 |
| Product of Example 5 | 10 | 9 | 9 | 0.14 | 2.0 | 4.5 | 1.96 | 4.48 | 7.0 |

[1] Milligrams per 10 grams oil.

The detergent properties of the copolymers of my invention are further demonstrated by the data in Table III, which are the results of the carbon suspension test (C. B. Biswell et al., Ind. Eng. Chem., 47, 1598, 1601 (1955)). The products were tested at 0.5% concentration in 70 cc. kerosene with three grams of a paste containing 20% carbon black in a heavy white oil base, stirring the mixture five minutes in a 100 cc. graduate in a Herschel demulsibility tester at room temperature (25° C.). After 5 days (120 hours) the percentage of carbon black which had settled out was recorded.

*Table III*

| Product: | Percent settled in 120 hours |
|---|---|
| None | 90 (in 4 hours). |
| Example 2 | 0. |
| Example 3 | 0. |
| Example 4 | 0. |
| Example 5 | 0. |
| Example 6 | 0. |
| Example 7 | 90 (in 6 hours). |
| Example 8 | 90 (in 6 hours). |

It can be seen from the above data that the novel copolymers of my invention are effective both as viscosity index improvers and detergents in oils. By contrast, a comparison in Table III of the product of Example VII with that of Example III and of Example VIII with Example VI shows that polymers similar to those of the invention except containing no azomethine (Examples VII and VIII) possess no detergent properties whatsoever.

The products of this invention can be used in lubricating oils in concentrations of from about 0.01% to about 10% and preferably from about 0.5% to about 5% by weight. Although the present invention has been illustrated by the use of these products in mineral lubricating oils it is not restricted thereto. Other lubricating oil bases can be used, such as hydrocarbon oils, both natural and synthetic, for example, those obtained by the polymerization of olefins, as well as synthetic lubricating oils of the alkylene oxide type and the polycarboxylic acid ester type, such as the oil soluble esters of adipic acid, sebacic acid, azelaic acid, etc. It is also contemplated that various other well knwon additives, such as antioxidants, anti-foaming agents, pour point depressors, extreme pressure agents, antiwear agents, etc., may be incorporated in lubricating oils containing the additives of my invention.

Concentrates of a suitable oil base containing more than 10%, for example up to 50% or more, of the copolymers of this invention alone or in combination with other additives can be used for blending with hydrocarbon oils or other oils in the proportions desired for the particular conditions of use to give a finished product containing from about 0.01% to about 10% of the copolymers of this invention.

Unless otherwise stated, the percentages given herein and in the claims are percentages by weight.

While I have described my invention by reference to specific embodiments thereof, the same are given by way of illustration only. Modifications and variations will be apparent from my description to those skilled in the art.

Having described my invention, I claim:

1. An oil-soluble copolymer having a molecular weight not greater than about 125,000, the monomeric units of which copolymer consist essentially of a tertiary alkyl azomethine having the formula:

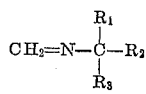

wherein $R_1$, $R_2$ and $R_3$ represent alkyl, said azomethine having from 5 to about 30 carbon atoms in the molecule, and a substituted-hydrocarbon monomer having terminal ethylenic unsaturation and having as the substituent a negative group selected from the class consisting of aryl, acyloxy, alkoxy, aroyloxy, aryloxy, carbaloxy, halogen and cyano, said substituent being bonded to the unsaturated carbon of said terminal ethylenic unsaturation and said substituted hydrocarbon monomer having from about 6 to about 30 carbon atoms, the mole ratio of said azomethine to said substituted-hydrocarbon monomer being in the range of from about 1:100 to about 10:1, said copolymer being produced by copolymerization of said azomethine with said substituted-hydrocarbon monomer at a temperature in the range of from about 25° C. to about 185° C.

2. An oil-soluble copolymer having a molecular weight in the range of from about 10,000 to about 125,000, the monomeric units of which copolymer consist essentially of a tertiary alkyl azomethine having a total of from 5 to 30 carbon atoms and corresponding to the formula:

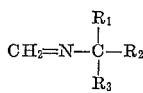

wherein $R_1$, $R_2$ and $R_3$ represent alkyl, and a substituted-hydrocarbon monomer having terminal ethylenic unsaturation and having as the substituent a negative group selected from the class consisting of aryl, acyloxy, alkoxy, aroyloxy, aryloxy, carbaloxy, halogen and cyano, said substituent being bonded to the unsaturated carbon of said terminal ethylenic unsaturation and said substituted-hydrocarbon monomer having from 10 to 24 carbon atoms, the mole ratio of said azomethine to said substituted-hydrocarbon monomer being in the range of from about 1:100 to about 10:1, said copolymer being produced by copolymerization of said azomethine with said substituted-hydrocarbon monomer at a temperature in the range of from about 80° C. to about 120° C.

3. The copolymer of claim 1 wherein said substituted-hydrocarbon monomer is 2-ethylhexyl acrylate.

4. The copolymer of claim 1 wherein said substituted-hydrocarbon monomer is n-lauryl methacrylate.

5. The copolymer of claim 1 in which said azomethine contains from about 9 to about 16 carbon atoms in the molecule.

6. The copolymer of claim 5 wherein said azomethine is t-octyl azomethine.

7. The copolymer of claim 2 which has as a monomeric unit a diester of butenedioic acid, said diester having the formula:

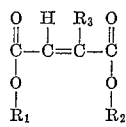

wherein $R_1$ and $R_2$ represent alkyl having from about 4 to about 22 carbon atoms and $R_3$ is selected from the class consisting of hydrogen and methyl, the mole ratio of said substituted-hydrocarbon monomer to said diester being within the range of from about 1:2 to about 4:1, said copolymer being formed by said copolymerization with said diester in admixture with said azomethine and said substituted-hydrocarbon monomer at said copolymerization temperature.

8. The copolymer of claim 7 in which said azomethine contains from about 9 to about 16 carbon atoms in the molecule.

9. The copolymer of claim 7 in which said azomethine is t-octyl azomethine.

10. The copolymer of claim 7 in which said diester is a diester of fumaric acid.

11. The copolymer of claim 7 in which said diester is di-iso-octyl fumarate.

12. The copolymer of claim 7 in which said substituted-hydrocarbon monomer is styrene.

References Cited in the file of this patent

UNITED STATES PATENTS

| | | |
|---|---|---|
| 2,438,091 | Lynch | Mar. 16, 1948 |
| 2,570,788 | Giammaria | Oct. 9, 1951 |
| 2,584,968 | Catlin | Feb. 12, 1952 |
| 2,616,853 | Giammaria | Nov. 4, 1952 |
| 2,728,751 | Catlin et al. | Dec. 27, 1955 |
| 2,810,744 | Popkin | Oct. 22, 1957 |

OTHER REFERENCES

Tomayo et al.: Chem. Abst., 42, 1571 (1948).